(12) United States Patent
Eddins et al.

(10) Patent No.: US 9,729,994 B1
(45) Date of Patent: Aug. 8, 2017

(54) SYSTEM AND METHOD FOR LISTENER CONTROLLED BEAMFORMING

(71) Applicants: David A. Eddins, Odessa, FL (US); David A. Borkholder, Canandaigua, NY (US); Vincent J. Amuso, Webster, NY (US)

(72) Inventors: David A. Eddins, Odessa, FL (US); David A. Borkholder, Canandaigua, NY (US); Vincent J. Amuso, Webster, NY (US)

(73) Assignees: University of South Florida, Tampa, FL (US); Rochester Institute of Technology, Rochester, NY (US)

( * ) Notice: Subject to any disclaimer, the term of this patent is extended or adjusted under 35 U.S.C. 154(b) by 211 days.

(21) Appl. No.: 14/456,577

(22) Filed: Aug. 11, 2014

Related U.S. Application Data

(60) Provisional application No. 61/864,162, filed on Aug. 9, 2013.

(51) Int. Cl.
*H04S 7/00* (2006.01)
*G01S 7/52* (2006.01)
(Continued)

(52) U.S. Cl.
CPC .............. *H04S 7/302* (2013.01); *H04S 7/304* (2013.01); *G01S 7/52047* (2013.01); *G01S 15/8915* (2013.01); *G06F 3/048* (2013.01); *G10K 11/341* (2013.01); *H04R 2203/12* (2013.01); *H04R 2430/20* (2013.01); *H04S 2400/11* (2013.01)

(58) Field of Classification Search
CPC . H04S 7/302; H04S 7/40; H04S 7/303; H04S 7/304; H04S 2400/11; H04S 2400/15; H04R 2203/12; H04R 5/00; H04R 29/00; H04R 2430/20; H04R 2499/11; H04R 1/406; H04R 25/40; H04R 5/02; H04R 29/005; G06T 11/00; G06T 19/006; G01S 3/803; G01S 7/52047; G01S 15/8915;
(Continued)

(56) References Cited

U.S. PATENT DOCUMENTS

| | | | |
|---|---|---|---|
| 8,073,157 B2 * | 12/2011 | Mao | H04R 1/406 381/111 |
| 8,213,634 B1 * | 7/2012 | Daniel | H04R 3/005 381/122 |

(Continued)

*Primary Examiner* — Davetta W Goins
*Assistant Examiner* — Oyesola C Ojo
(74) *Attorney, Agent, or Firm* — Molly L. Sauter; Smith & Hopen, P.A.

(57) ABSTRACT

A system and method for providing assistive listening for a plurality of listeners in an environment including a plurality of acoustic sources. A microphone array in combination with an acoustic beamforming processor configured to receive the acoustic signals within the environment and to process the acoustic signals based upon a target location of an acoustic signal selected on a listener-controlled interface device to generate a steered beam pattern. The acoustic beamforming processor further configured to transmit the steered beam pattern to the listener-controlled interface device based on the target location selected. The listener-controlled interface device configured to provide the steered beam pattern to an ear-level transducer of a hearing-impaired listener.

18 Claims, 4 Drawing Sheets

(51) Int. Cl.
*G10K 11/34* (2006.01)
*G01S 15/89* (2006.01)
*G06F 3/048* (2013.01)

(58) Field of Classification Search
CPC .. G01S 15/8927; G10K 11/34; G10K 11/341;
G06F 3/048; G06F 3/16
USPC ............................................................ 381/1
See application file for complete search history.

(56) References Cited

U.S. PATENT DOCUMENTS

| | | | | |
|---|---|---|---|---|
| 9,412,375 | B2* | 8/2016 | Xiang | H04R 3/005 |
| 9,495,591 | B2* | 11/2016 | Visser | G06K 9/00624 |
| 2003/0065262 | A1* | 4/2003 | Stergiopoulos | G01S 7/52046 |
| | | | | 600/437 |
| 2008/0259731 | A1* | 10/2008 | Happonen | G10K 11/34 |
| | | | | 367/121 |
| 2010/0254543 | A1* | 10/2010 | Kjolerbakken | H04R 1/406 |
| | | | | 381/92 |
| 2012/0224714 | A1* | 9/2012 | Couse | H04R 1/406 |
| | | | | 381/92 |
| 2012/0288126 | A1* | 11/2012 | Karkkainen | H04R 3/005 |
| | | | | 381/309 |
| 2013/0177168 | A1* | 7/2013 | Inha | H04N 5/602 |
| | | | | 381/92 |
| 2013/0342731 | A1* | 12/2013 | Lee | H04N 5/23293 |
| | | | | 348/231.4 |
| 2014/0376728 | A1* | 12/2014 | Ramo | G06T 19/006 |
| | | | | 381/56 |
| 2015/0016642 | A1* | 1/2015 | Walsh | H04S 7/301 |
| | | | | 381/307 |

\* cited by examiner

SYSTEM AND METHOD FOR LISTENER CONTROLLED BEAMFORMING

CROSS-REFERENCE TO RELATED APPLICATIONS

This application claims priority to U.S. Provisional Patent Application 61/864,162, entitled, "Adaptive User-Guided Assistive Listening System", filed Aug. 9, 2013, the contents of which are herein incorporated by reference.

STATEMENT OF GOVERNMENT INTEREST

This invention was made with Government support under Grant Number 0967732 awarded by the National Science Foundation. The Government has certain rights in the invention.

BACKGROUND OF THE INVENTION

Interfering speech, reverberation, and temporally-fluctuating background noise have a significant negative impact on speech perception for the hearing impaired. While directional microphone arrays employing beamforming techniques have been shown to improve key metrics of speech intelligibility, especially for the hearing impaired, minimal user guidance capabilities have limited the achievable benefits for the hearing impaired user in multi-talker situations. It is widely accepted that current personal assistive listening systems, including those with directional microphone technology, are inadequate in small-group, multi-talker, multi-listener settings. The systems currently known in the art have significant limitations, including the inability of the personal assistive listening systems to operate effectively in realistic environments.

Accordingly, what is needed in the art is an assistive listening system and method that provides sufficient hearing improvement for listeners operating in an environment where there are multiple acoustic sources, such as in a multi-talker and/or noisy environment.

SUMMARY OF INVENTION

The user controlled beamforming assistive listening system and method of the present invention uses signal processing algorithms for sound classification and enhancement. Additionally, the system utilizes multiple microphones and delay-sum beamforming techniques to reduce the impact of room acoustics and coherent/incoherent noise sources. The system introduces a novel and sophisticated interface for user-guidance to a target acoustic source (talker) that has the potential to greatly enhance assistive listening system performance in multi-talker environments. The assistive listening system of the present invention will benefit individuals who experience communication difficulty in small to medium sized group listening situations with the potential to improve social, economic, and quality of life of the user of the system.

A method to provide assistive listening for a plurality of listeners in an environment comprising a plurality of acoustics sources in accordance with the present invention includes, receiving an acoustic signal from each of a plurality of acoustic sources located in an environment and displaying a location of each of the plurality of acoustic sources in the environment on one or more listener-controlled interface devices. A user of the system utilizes the listener-controlled interface device for selecting a target location of an acoustic device from the locations displayed on the one or more listener-controlled interface devices. After a target location has been selected by a user, the method further includes, processing the acoustic signals from each of the plurality of acoustic sources to generate a steered beam pattern focused at the target location selected on each of the one or more listener-controlled interface devices and transmitting the steered beam pattern to one or more of the listener-controlled interface devices based upon the target location selected on the listener-controlled interface device. The steered beam pattern may then be transmitted from the listener-controlled interface to an ear-level transducer.

A system to provide assistive listening for a plurality of listeners in an environment comprising a plurality of acoustics sources in accordance with the present invention includes, a microphone array configured for receiving an acoustic signal from each of a plurality of acoustic sources located in an environment and at least one listener-controlled interface device configured for displaying a location of each of the plurality of acoustic sources in the environment and for selecting a target location of an acoustic device from the displayed locations. The system further includes, an acoustic beamforming processor coupled to the microphone array and to the listener-controlled interface device, the acoustic beamforming processor configured for processing the acoustic signals received from each of the plurality of acoustic sources and the target location selected on the listener controlled interface device and for transmitting the steered beam pattern to the listener-controlled interface device based on the target location selected on the listener-controlled interface device. The listener-controlled interface device is further configured for transmitting the steered beam pattern from the listener-controlled interface device to an ear-level transducer worn by a listener.

Accordingly, the listener controlled beamforming assistive listening system and method of the present invention provides a beam pattern that is customized to an acoustic source selected by each of the listeners and the beamforming processor provides a steered beam pattern to each of the plurality of listeners which increases each of the listeners ability to successfully hear the acoustic signal emanating from a specific acoustic source selected in an environment which includes a plurality of acoustic sources.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

The system and method of the present invention will meet the needs of a small, but substantial, portion of the hearing impaired population by providing them with the ability to adaptively guide an acoustic focal zone to a desired target in a fast, simple, and unobtrusive fashion.

The adaptive, user-guided assistive listening system of the present invention supports multiple simultaneous users and improves speech understanding and the ease of communication in difficult, multi-talker communication environments. The system combines user-controlled acoustic directivity coupled with speaker identification and target tracking capabilities and wireless device communication. Acoustic beamforming and parallel processing allows multiple users to control an acoustic focal zone while attenuating competing sound sources outside the focal zone. A hybrid pattern recognition scheme incorporating several techniques for parameter extraction and speaker identification allows robust dynamic identification of speakers in multi-talker situations. The target tracking algorithm dynamically steers the acoustic focal zone as the talker moves through the meeting area, relieving the listener of the burden of manual tracking. The listener-controlled interface device provides spatial information for each identified talker, allowing the listener to independently select the desired talker or manually steer the acoustic beam to a desired location. Multi-channel wireless communication is used to link listener-controller interface devices to the beamforming central processing system and to deliver the desired acoustic signal, either directly or via an intermediate device, to ear-level speakers (e.g., hearing aids, headphones).

Figure 1:
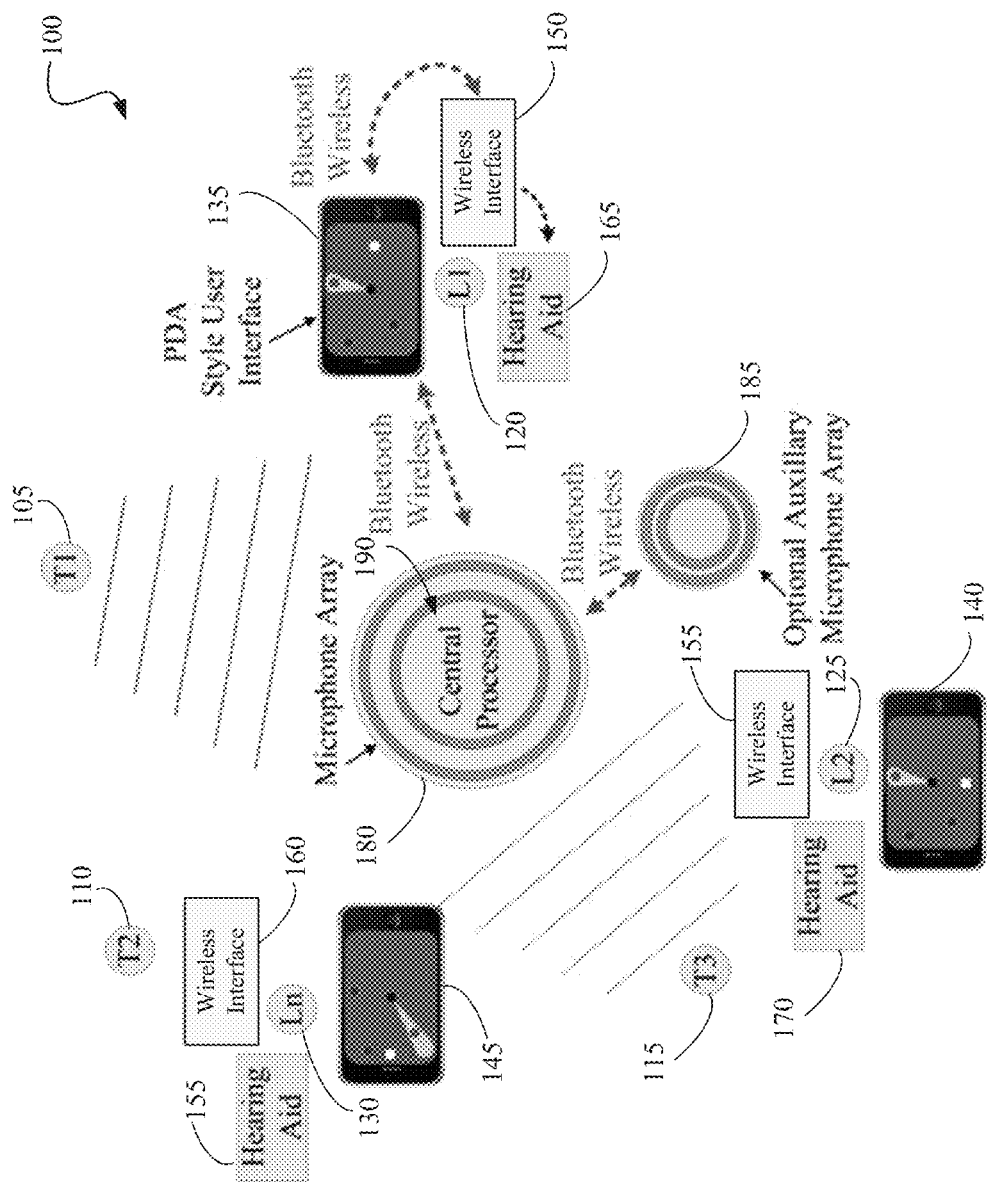
FIG. 1 is a diagrammatic view of an assistive listening system in accordance with an embodiment of the present invention.

With reference to FIG. 1, an assistive listening system 100 in accordance with the present invention includes, a microphone array 180, an acoustic beamforming processor 190 coupled to the microphone array 180 and a plurality of listener-controlled interface devices 135, 140, 145 coupled to the acoustic beamforming processor 190. In one embodiment, the acoustic beamforming processor 190 may be coupled to the plurality of listener-controlled interface devices 135, 140, 145 through a wireless connection, such as a Bluetooth connection, which is commonly known in the art. Additionally, each of the listener-controlled interface devices 135, 140, 145 may be coupled to an ear-level transducer 165, 170, 175 worn by the listener. Alternatively, the listener-controlled interface devices 135, 140, 145 may be coupled to the ear-level transducers 165, 170, 175 though an intermediate device such as a wireless interface 150, 155, 160. In a particular embodiment, the wireless interface 150, 155, 160 is a hand-held or body-word Bluetooth interface that communicates wirelessly, via induction, with the ear-level transducers 165, 170, 175. The ear-level transducers 165, 170, 175 may be earphones, headsets, hearing aids, or cochlear implants that communicate wirelessly with the Bluetooth interface 150, 155, 160.

Each of the listener-controlled interface devices 135, 140, 145 may be associated with a listener 120, 125, 130 that is present in the environment of the microphone array 180. As such, in the illustrated embodiment, listener L1 120 is using listener-controlled interface device 135 to communicate with the acoustic beamforming processor 190, listener L2 125 is using listener-controlled interface device 140 to communicate with the acoustic beamforming processor 190 and listener Ln 130 is using listener-controlled interface device 145 to communicate with the acoustic beamforming processor 190. The listener-controlled interface devices 135, 140, 145 may be embodied as smart phones, personal digital assistants (PDA), or any of a variety of other devices capable of receiving and transmitting acoustic signals between one or more attached devices and providing a graphical user interface that provides communication between the acoustic beamforming processor 190 and a listener. In a particular embodiment, the listener-controlled interface device 135, 140, 145 includes a graphical user interface having a touch-screen.

In operation, each of the listener-controlled interface devices 135, 140, 145 communicates with the acoustic beamforming processor 190 and displays the location of each of the acoustic sources 105, 110, 115 that are within the environment. The display shows the listener which of the talkers (T1, T3) are currently active and therefor transmitting an acoustic signal to the microphone array 190 and which of the talkers are currently inactive (T2) in the environment. In one embodiment, the location of the acoustic sources 105, 110, 115 are relative to the location of the listener-controller interface device 135, 140, 145 and the location of the microphone array 180 is additionally illustrated on the display. The listener 120, 125, 130 uses the graphical user interface capability of listener-controlled interface device 135, 140, 145 to select a target location of an acoustic source 105, 110, 115 from the displayed locations on the display. For example, as shown with reference to FIG. 1, utilizing their listener-controlled interface devices, listener L1 120 and listener L2 125 have selected the acoustic source associated with talker T1 105 and listener Ln 130 has selected the acoustic source associated with talker T3 115.

Alternatively, the listener may select a location on the display of the listener-controlled interface device 135, 140, 145 that is not associated with a particular talker in the environment.

After a listener has selected a target location of the acoustic source, the microphone array 180 and the acoustic beamforming processor 190 work in combination to provide a steered beam of the selected acoustic source to each of the listener-controlled interface devices 135, 140, 145 based upon the input received from each of the listeners. The beam that is steered to each of the listener-controlled interfaces devices 135, 140, 145 is then transmitted to an ear-level transducer, such as a hearing-aid or headphones, worn by the listener 120, 125, 130. In this way, the assistive listening system of the present invention 100 can simultaneously provide a unique acoustic signal to each of a plurality of listeners that is focused on a specific target location that is selected by the listener.

The microphone array 180 of the present invention is configured to receive an acoustic signal from a plurality of acoustic sources located in the environment. These acoustic sources may be human speakers within the range of the microphone array 180 or any of a variety of other sources of acoustic signals known in the art. With reference to FIG. 1, three talkers (T1, T2, T3) 105, 110, 115 are positioned within the receiving range of the microphone array 180 and the microphone array 180 can receive acoustic signals from one or more of the talkers 105, 110, 115 that are actively transmitting acoustic signals. In FIG. 1, the microphone array 180 is depicted as receiving acoustic signals from active sources T1 105 and T3 115.

In one embodiment the microphone array 180 comprises a plurality of MEMs (micro-electromechanical) transducers fabricated in a grid pattern. In a particular embodiment a total of 256 microphone transducers are arranged in a 16×16 grid pattern and are spaced 3 cm apart (aperture-to-aperture measurement). The microphone transducers are configured as right and left pairs (L/R) that share a bit rate, baud rate and data. The data from each of the microphone pairs is time-division multiplexed according to the I$^2$S standard for configuring L/R data collection and the serial data is transmitted on a 128 line bus. Additionally, all the microphones in the microphone array 180 share a common clock line and a common word line.

The acoustic beamforming processor 190 uses the signals from each of the microphones of the microphone array 180 to form a beam. In operation of a particular embodiment, the acoustic beamforming processor 190 receives the signals from the 256 microphones and simultaneously transmits an acoustic data stream of listener-selected steering beams to each of a plurality of listeners.

Acoustic beamforming is known in the art for improving the quality of a received audio signal by processing a plurality of audio signals received from an array of microphones. Acoustic beamforming is effective in improving the quality of an acoustic signal emitted by an acoustic source operating in a noisy environment. In general, beamforming techniques amplify the acoustic signals in the direction of a desired acoustic source and attenuate the acoustic signals in the directions that are not in the direction of a desired acoustic source.

After the acoustic signals from all the acoustic sources that are active in the environment have been received at the microphone array 180, the acoustic beamforming processor 190 processes the acoustic signals received from each of the plurality of acoustic sources T1 105 and T3 115 and the target location selected on the listener controlled interface device. The acoustic beamforming processor then processes the acoustic signals to generate a steered beam pattern for each of the listener-controller interface devices. In generating the steered beam pattern, the acoustic beamforming processor employs weighting and time-delay techniques to performing delay-sum beamforming of the plurality of acoustic signals based upon the target location selected by the listener. In one embodiment, given the geometry and the spacing of the microphones in the microphone grid array, the acoustic signal arrives at each of the microphones at a different point in time. To amplify an acoustic signal from a desired location, the acoustic beamforming processor 190 delays the acoustic signal received from the desired location at each of the microphones and sums them to together.

In generating the steered beam pattern, the acoustic beamforming processor 190 may include circuitry and software to perform analog-to-digital (A/D) conversion, digital-to-analog (D/A) conversion, speech coding and decoding, encryption and decryption, error detection and error correction, bit stream translation, filtering, or any of a variety of other functions necessary to steer the beam pattern to a target location specified by the listener. As such, the acoustic beamforming processor 190 is configured to focus the direction of an acoustic beam generated by the plurality of microphones of the microphone array toward a target location in response to an input from the listener-controlled interface device indicating the target location.

In order for the acoustic beamforming processor 190 to correctly interpret steering input from each listener-controlled interface device, it is necessary for the acoustic beamforming processor 190 to determine the location of the listener-controlled interface device relative to the acoustic beamforming processor 190. This spatial calibration can be initiated by the acoustic beamforming processor 190 which will establish the wireless link and instruct the listener (audible instructions through the listener-controlled interface device) to touch the screen at the location representing their spatial location in the room relative to the acoustic beamforming processor 190. In this way, the beamforming processor 190 is configured for performing spatial calibration to identify a location the listener-controlled interface device in the environment.

In an additional embodiment, one or more of the acoustic sources may be mobile acoustic sources and the acoustic beamforming processor 190 may further be configured for tracking the movement of one or more of the mobile acoustic sources and adjusting the steered beam pattern based upon the movement of the one or more mobile acoustic sources.

In another embodiment, the acoustic source may be a human speaker and the acoustic beamforming processor 190 may further be configured for analyzing one or more characteristics of the human speaker acoustic source and identifying the human speaker acoustic source as belonging to one of a plurality of known human speakers.

Figure 2:
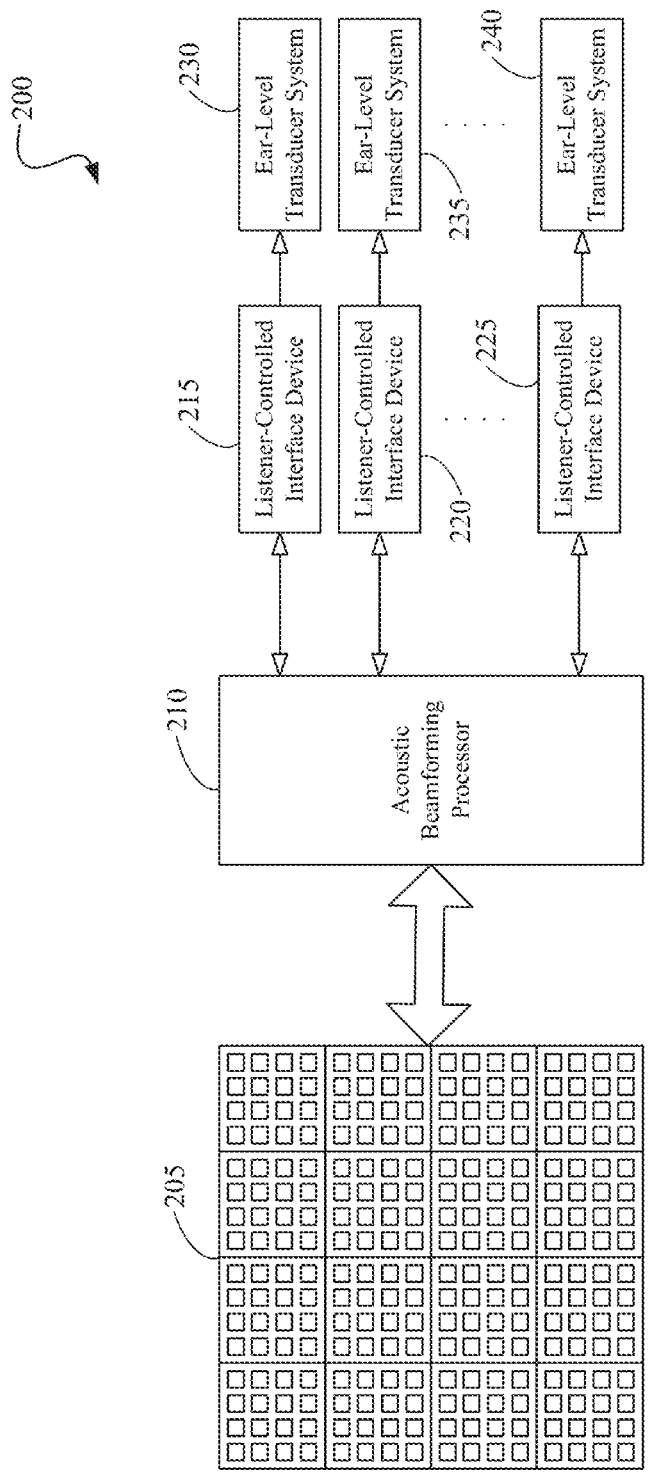
FIG. 2 is a block view of the components of an assistive listening system in accordance with an embodiment of the present invention.

With reference to FIG. 2, a block diagram illustrating the components of the assistive listening system 200 includes, a microphone array 205, a acoustic beamforming processor 210 coupled to the microphone array, a plurality of listener-controlled interface devices 215, 220, 225 coupled to the acoustic beamforming processor 210 and an ear-level transducer system 230, 235, 240 coupled to each of the listener-controlled interface devices 215, 220, 225.

As shown with reference to FIG. 2, acoustic signals from the microphone array 205 are received at the acoustic beamforming processor 210 and the acoustic beamforming processor 210 performs parallel processing of the acoustic signals to generate a steered beam for each of the listener-controlled interface devices 215, 220, 225 based upon a targeted acoustic source identified by the listener-controlled interface devices that is communicated to the acoustic beamforming processor 210. Each of the listener-controlled interface devices 215, 220, 225 then transmits the steered beam to each of the associated ear-level transducer systems 230, 235, 240. As such, the acoustic beamforming processor 190 customizes the acoustic signals received from one microphone array 205 and simultaneously provides a customized steered listening beam to a plurality of listeners.

Figure 3:
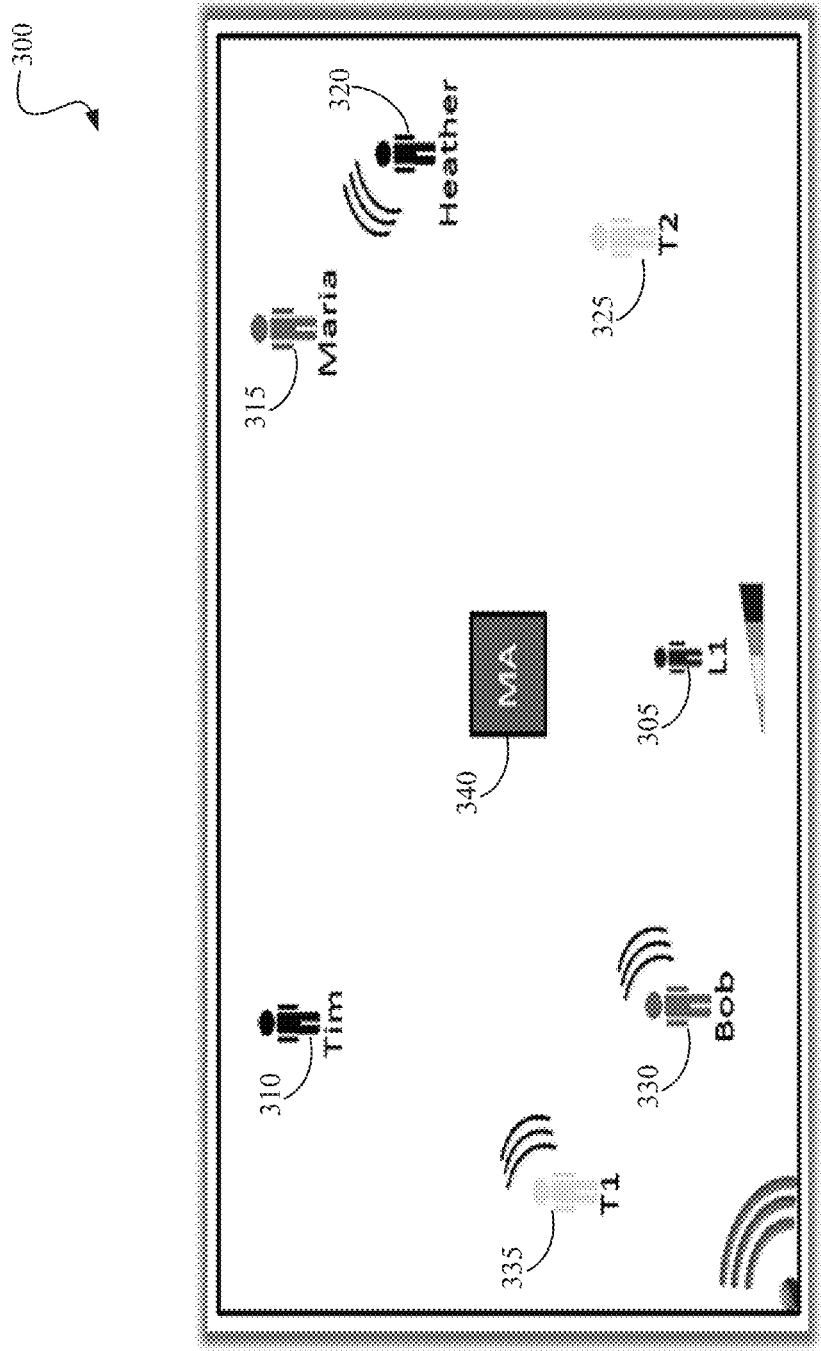
FIG. 3 is a diagrammatic view of a graphical user interface of the listener-controlled interface device in accordance with an embodiment of the present invention.

An exemplary embodiment of the graphical user display of a listener-controlled interface device 300 is illustrated with reference to FIG. 3. As shown, the microphone array 340 is shown on the display, along with locations of each of the active talkers T1 335, Bob 330 and Heather 320. In addition, the location of the inactive talkers Tim 310, Maria 315 and T2 325 are also displayed. The display may additionally show the location of the listener L1 305 as identified by spatial calibration as previously described. The illustration of FIG. 3 is a simplified embodiment and it is within the scope of the invention to provide one of a variety of configurations for the graphical user interface of the listener-controlled interface device 300.

Figure 4:
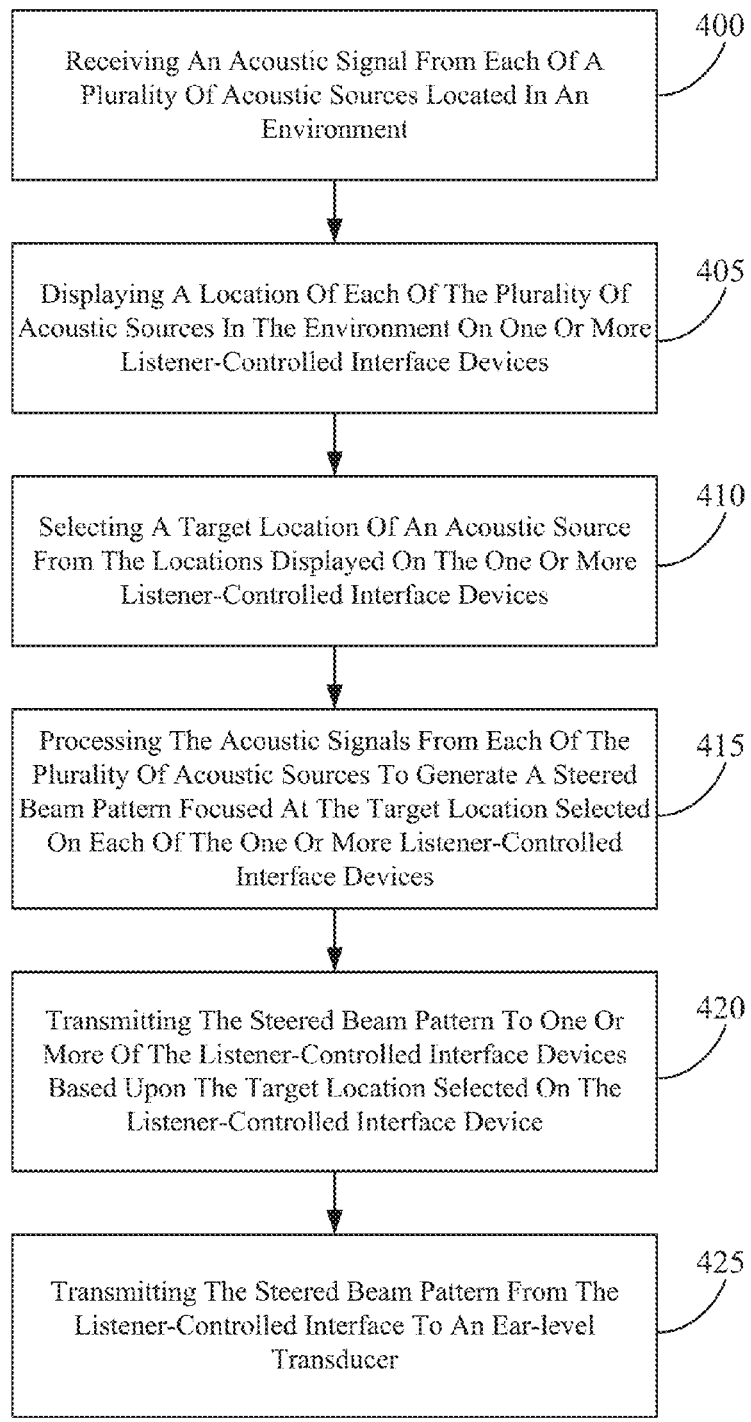
FIG. 4 is a flow diagram illustrating a method of providing assistive listening for a plurality of listeners in an environment comprising a plurality of acoustics sources in accordance with an embodiment of the present invention.

With reference to FIG. 4, a method to provide assistive listening for a plurality of listeners in an environment comprising a plurality of acoustics sources includes receiving an acoustic signal from each of a plurality of acoustic sources located in an environment 400. In a specific embodiment, the acoustic signals are received at a microphone array 205 comprising a plurality of microphone transducers organized in a grid pattern.

After the acoustic signals are received at the microphone array 205, the method continues by displaying a location of each of the plurality of acoustic sources in the environment on one or more listener-controlled interface devices 405. The acoustic beamforming processor 210 processes the signals from the microphone array 205 and generates a display of the locations of the acoustic signals on the listener-controlled interface devices 215, 220, 225. After the acoustic sources are displayed on the listener-controlled interface devices, the method continues by selecting a target location of an acoustic source from the locations displayed on the one or more listener-controlled interface devices 410.

After the target location has been selected, the acoustic beamforming processor 210 continues the method by processing the acoustic signals from each of the plurality of acoustic sources to generate a steered beam pattern focused at the target location selected on each of the one or more listener-controlled interface devices 415. The acoustic beamforming processor 210 then transmits the steered beam pattern to one or more of the listener-controlled interface devices based upon the target location selected on the listener-controlled interface device 420. The listener-controlled interface device then transmits the steered beam pattern to the ear-level transducer of the listener 425.

The adaptive, user-guided assistive listening system of the present invention will remove barriers to the delivery of acoustic information to people who are deaf or hard of hearing, enhancing their participation in education, work, and social settings, and improving their quality of life.

The present invention may be embodied on various computing platforms that perform actions responsive to software-based instructions. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method to provide assistive listening for a plurality of listeners in an environment comprising a plurality of acoustics sources, the method comprising:

receiving, at one or more microphone arrays located in an environment, an acoustic signal from each of a plurality of acoustic sources located in the environment, wherein one or more of the plurality of acoustic sources are mobile acoustic sources;

transmitting the acoustic signal received from each of the plurality of acoustic sources located in the environment to an acoustic beam forming processor;

determining, at the acoustic beamforming processor, a location of each of the plurality of acoustic sources in the environment;

transmitting, from the acoustic beamforming processor, the location of each of the plurality of acoustic sources in the environment to one or more listener-controlled interface devices located in the environment, wherein each of the one or more listener-controlled interface devices are located distant from the acoustic beamforming processor;

displaying the location of each of the plurality of acoustic sources in the environment on the one or more listener-controlled interface devices;

selecting a target location of a mobile acoustic source from the locations displayed on the one or more listener-controlled interface devices;

processing, at the acoustic beamforming processor, the acoustic signals from each of the plurality of acoustic sources to generate a steered beam pattern focused at the target location of the mobile acoustic source selected on each of the one or more listener-controlled interface devices;

transmitting, from the acoustic beamforming processor, the steered beam pattern to one or more of the listener-controlled interface devices based upon the target location of the mobile acoustic source selected on the listener-controlled interface device;

tracking, at the acoustic beamforming device, the movement of the target location of the mobile acoustic source using a an acoustic tracking algorithm; and adjusting, at the acoustic beamforming device, the steered beam pattern based upon the movement of the target location of the mobile acoustic source.

2. The method of claim 1, further comprising, transmitting the steered beam pattern from the listener-controlled interface to an ear-level transducer.

3. The method of claim 1, wherein processing, at the acoustic beamforming device, the acoustic signals from each of the plurality of acoustic sources to generate a steered beam pattern focused at the target location selected on each of the one or more listener-controlled interface devices further comprises, performing delay-sum beamforming of each of the plurality of acoustic signals based upon the selected target location.

4. The method of claim 1, wherein processing, at the acoustic beamforming device, the acoustic signals from each of the plurality of acoustic sources to generate a steered beam pattern focused at the target location selected on each of the one or more listener-controlled interface devices further comprises, amplifying the one or more acoustic signals of the acoustic sources at the selected target location.

5. The method of claim 1, wherein processing, at the acoustic beamforming device, the acoustic signals from each of the plurality of acoustic sources to generate a steered beam pattern focused at the target location selected on each of the one or more listener-controlled interface devices further comprises, attenuating the acoustic signals of the acoustic sources at the locations other than the selected target location.

6. The method of claim 1, further comprising, performing spatial calibration to identify a location of each of the listener-controlled interface devices in the environment.

7. The method of claim 1, wherein the mobile acoustic source is a human speaker acoustic source, the method further comprising:

analyzing one or more characteristics of the human speaker acoustic source;

identifying the human speaker acoustic source as belonging to one of a plurality of known human speakers; and wherein tracking, at the acoustic beamforming device, the movement of the target location of the mobile acoustic source using an acoustic tracking algorithm further comprises tracking the movement of the target location of the mobile acoustic source based upon the identification of the human speaker.

8. A system to provide assistive listening for a plurality of listeners in an environment comprising a plurality of acoustics sources, the system comprising:

an acoustic beam forming processor;

a microphone array configured for receiving an acoustic signal from each of a plurality of acoustic sources located in an environment and for transmitting the acoustic signal received from each of the plurality of acoustic sources located in the environment to the acoustic beam forming processor, wherein one or more of the acoustics sources are mobile acoustic sources;

a listener-controlled interface device located in the environment, wherein the listener-controlled interface device is located distant from the acoustic beamforming processor;

the acoustic beam forming processor configured for determining a location of each of the plurality of acoustic sources in the environment and for transmitting the location of each of the plurality of acoustic sources in the environment to the listener-controlled interface device;

the listener-controlled interface device configured for displaying the location of each of the plurality of acoustic sources in the environment on the listener-controlled interface device and for selecting a target location of a mobile acoustic source from the locations displayed on the listener-controlled interface device;

the acoustic beamforming processor further configured for processing the acoustic signals received from each of the plurality of acoustic sources and the target location of the mobile acoustic source selected on the listener controlled interface device to generate a steered beam pattern focused at the target location of the mobile acoustic source selected on the listener-controlled interface device, for transmitting the steered beam pattern to the listener-controlled interface devices based on the target location of the mobile acoustic source selected on the listener-controlled interface device, for tracking the movement of the target location of the mobile acoustic source using an acoustic tracking algorithm and for adjusting the steered beam pattern based upon the movement of the target location of the mobile acoustic source.

9. The system of claim 8, wherein the listener-controlled interface device is further configured for transmitting the steered beam pattern from the listener-controlled interface device to an ear-level transducer.

10. The system of claim 8, wherein the beamforming processor is further configured for performing delay-sum beamforming of each of the plurality of acoustic signals based upon the target location selected.

11. The system of claim 8, wherein the beamforming processor is further configured for amplifying the one or more acoustic signals of the acoustic sources at the target location selected.

12. The system of claim 8, wherein the beamforming processor is further configured for attenuating the acoustic signals of the acoustic sources at the locations other than the target location selected.

13. The system of claim 8, wherein the beamforming processor is further configured for performing spatial calibration to identify a location the listener-controlled interface device in the environment.

14. The system of claim 8, wherein the acoustic source is a human speaker acoustic source and wherein the beamforming processor is further configured for analyzing one or more characteristics of the human speaker acoustic source, and identifying the human speaker acoustic source as belonging to one of a plurality of known human speakers and tracking the movement of the target location of the mobile acoustic source using an acoustic tracking algorithm upon the identification of the human speaker.

15. The system of claim 8, wherein the microphone array comprises a plurality of MEMs transducers fabricated in a grid pattern.

16. The system of claim 8, wherein the listener-controlled interface device comprises a graphical user interface.

17. The system of claim 8, wherein the beamforming processor is a parallel processor.

18. A system to provide assistive listening for a plurality of listeners in an environment comprising a plurality of acoustics sources, the system comprising:
   an acoustic beam forming processor;
   a microphone array configured for receiving an acoustic signal from each of a plurality of acoustic sources located in an environment and for transmitting the acoustic signal received from each of the plurality of acoustic sources located in the environment to the acoustic beam forming processor, wherein one or more of the acoustics sources are mobile acoustic sources;
   a plurality of listener-controlled interface devices located in the environment, wherein the plurality of listener-controlled interface devices are located distant from the acoustic beamforming processor;
   the acoustic beam forming processor configured for determining a location of each of the plurality of acoustic sources in the environment and for transmitting the location of each of the plurality of acoustic sources in the environment to the plurality of listener-controlled interface devices;
   each of the plurality of listener-controlled interface devices configured for displaying the location of each of the plurality of acoustic sources in the environment on the listener-controlled interface device and for selecting a target location of a mobile acoustic source from the locations displayed on each of the plurality of listener-controlled interface devices;
   the acoustic beamforming processor further configured for processing the acoustic signals received from each of the plurality of acoustic sources and each target location of the mobile acoustic source selected on each of the plurality of listener controlled interface devices to generate a steered beam pattern focused at the target location of the mobile acoustic source selected on each of the plurality of listener-controlled interface devices, for transmitting the steered beam pattern to each of the plurality of listener-controlled interface devices based on the target location of the mobile acoustic source selected on each of the plurality of listener-controlled interface devices, for tracking the movement of each target location of the mobile acoustic source using an acoustic tracking algorithm and for adjusting the steered beam pattern based upon the movement of the target location of the mobile acoustic source; and
   an ear-level transducer coupled to each of the plurality of listener-controlled interface devices, the ear-level transducer configured to receive the steered beam pattern from the listener-controlled interface device.

* * * * *

UNITED STATES PATENT AND TRADEMARK OFFICE
CERTIFICATE OF CORRECTION

PATENT NO. : 9,729,994 B1
APPLICATION NO. : 14/456577
DATED : August 8, 2017
INVENTOR(S) : David A. Eddins et al.

Page 1 of 1

It is certified that error appears in the above-identified patent and that said Letters Patent is hereby corrected as shown below:

In the Claims

Column 10, Claim 13, Line 64 should read:
bration to identify a location of the listener-controlled interface Column 11, Claim 14, Line 3 should read:
identifying the human speaker acoustic source as Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*